(12) United States Patent
Imamura

(10) Patent No.: US 7,336,298 B2
(45) Date of Patent: Feb. 26, 2008

(54) VIDEO SIGNAL LEVEL MONITORING APPARATUS

(75) Inventor: Genichi Imamura, Kanagawa (JP)

(73) Assignee: Leader Electronics Corporation, Kanagawa-ken (JP)

( * ) Notice: Subject to any disclaimer, the term of this patent is extended or adjusted under 35 U.S.C. 154(b) by 442 days.

(21) Appl. No.: 10/758,277

(22) Filed: Jan. 16, 2004

(65) Prior Publication Data

US 2004/0233289 A1   Nov. 25, 2004

(30) Foreign Application Priority Data

Jan. 31, 2003   (JP)   ............... 2003/023705

(51) Int. Cl.
  *H04N 17/00*   (2006.01)
  *H04N 17/02*   (2006.01)
(52) U.S. Cl. .............. 348/184; 348/177; 348/180; 348/182
(58) Field of Classification Search ............. 348/177, 348/180–182, 184, 185, 644, 645, 661, 686; 345/589–591, 603; *H04N 17/00*
  See application file for complete search history.

(56) References Cited

U.S. PATENT DOCUMENTS

| 5,291,285 | A | * | 3/1994 | Yokoyama et al. ......... 348/180 |
| 5,519,440 | A | | 5/1996 | Baker |
| 5,872,592 | A | * | 2/1999 | Manea et al. ............... 348/181 |
| 5,949,495 | A | * | 9/1999 | Tallman et al. ............. 348/601 |
| 5,959,607 | A | * | 9/1999 | Montijo .................... 345/440.1 |
| 6,069,607 | A | * | 5/2000 | Everett et al. .............. 345/660 |
| 6,219,094 | B1 | * | 4/2001 | Gerlach et al. ............. 348/184 |
| 6,275,257 | B1 | * | 8/2001 | Tallman et al. ............. 348/184 |
| 6,389,070 | B1 | * | 5/2002 | Cugnini et al. ............. 375/232 |
| 6,433,835 | B1 | * | 8/2002 | Hartson et al. ............. 348/608 |
| 6,556,238 | B1 | * | 4/2003 | Abe et al. ................... 348/182 |
| 7,071,965 | B2 | * | 7/2006 | Baker ........................ 348/186 |
| 2004/0130625 | A1 | * | 7/2004 | Imamura et al. ............ 348/185 |

OTHER PUBLICATIONS

SDTV/HDTV, http://www.tektronix.co.jp/Products/Measurement_Prod/App_notes/wfm700_gamut_measure.pdf, 4 pages (Abstract only translated).
"Multi-format, Multi-standard Waveform Monitors," http://www.tek.com/site/ps/1,,25-14575-INTRO_EN,00.html?wt=340&link=/site/ps/1,,25-14575-INTRO_EN,00.html, Nov. 17, 2003, 24 pages.

* cited by examiner

*Primary Examiner*—Brian P. Yenke
(74) *Attorney, Agent, or Firm*—Fish & Richardson P.C.

(57) ABSTRACT

A video signal level monitoring apparatus which monitors the level of a video signal, said apparatus comprises means for inputting a first color difference component (Cb) and a second color difference component (Cr) of a component video signal, means for inputting a luminance component (Y) of the component video signal as a luminance component (Y) of a composite video signal, means for generating a color component (C) of the composite video signal from the first color difference component and the second color difference component, and means for displaying each of the amplitude values of the color component (C) and the luminance component (Y) in a one-dimensional direction. Preferably, the display means displays each amplitude value in a bar graph display and scale marks corresponding to a minimum acceptable value and a maximum acceptable value within a range in accordance with a predetermined standard.

7 Claims, 5 Drawing Sheets

US 7,336,298 B2

VIDEO SIGNAL LEVEL MONITORING APPARATUS

BACKGROUND OF THE INVENTION

The present invention relates to an apparatus for monitoring a video signal level and, more particularly, to an apparatus for monitoring a level of an NTSC (National Television System Committee) composite signal converted from a Y/color difference component signal.

Video signals such as a Y/color difference component signal and an NTSC composite signal are specified in accordance with various systems. Ordinarily, in broadcasting stations, a Y/color difference component signal is converted into an NTSC composite signal, and the NTSC composite signal is transmitted.

However, the range of the maximum amplitude level of the Y/color difference component signal is wider than the level range in which the NTSC composite signal is controlled. For this reason, the level of the NTSC. composite signal is not suitably controlled when level control only on the Y/color difference component signal is performed. Therefore there has been a demand for a level control method devised by considering an effect after conversion into the NTSC composite signal.

In general, the NTSC composite signal is encoded in accordance with the SMPTE170M standard established by the Society of Motion Picture and Television Engineers (SMPTE). Therefore, there is a need to control the level of the NTSC composite signal in the range (−40 IRE to +131 IRE) in accordance with the SMPTE170M standard shown in FIG. 1. There is a need to control the level of the luminance component (Y) in particular in the NTSC composite signal so that it does not exceed 120 IRE.

FIG. 2 is a diagram showing a display for controlling the level of the NTSC composite signal converted from the Y/color difference component signal as described in a non-patent document 1 shown below. The conventional method using the display shown in FIG. 2 enables control as to whether the level of the NTSC composite signal (a vector formed of a luminance component and a color component) is within the range in accordance with the SMPTE170M standard mapped on the Y-color difference plane.

[Non-Patent Document 1]

Tektronix Japan, Ltd., "GAMUT Measurement" (FIG. 5), [online], [search on Dec. 13, 2003], Internet<URL: http://www.Tektronix.co.jp/Products/Measurement_Prod/App_notes/wfm700_gamut_measure.pdf>.

SUMMARY OF THE INVENTION

It is necessary to provide a display showing the waveform of the original Y/color difference component signal or the NTSC composite signal after conversion as well as to control precisely the level of the NTSC composite signal, because information (e.g., information on distortion) other than the level can be obtained from the displayed waveform. The display shown in FIG. 2 has a large display area since the range in accordance with the SMPTE170M standard is shown in the Y-color difference plane. For this reason, the waveform monitor for controlling the level of the NTSC composite signal converted from the Y/color difference component signal has been incapable of simultaneously producing a level control display and a waveform display.

As a result, a user of the waveform monitor must select either the display for controlling the level of the NTSC composite signal or the display for controlling the waveform.

Accordingly, an object of the present invention is to provide a video signal level monitoring apparatus having a reduced display area for control of the level of the NTSC composite signal converted from the Y/color difference component signal.

Another object of the present invention is to provide a video signal level monitoring apparatus capable of simultaneously producing a display for controlling the level of the NTSC composite signal and a display for controlling the waveform of the original Y/color difference component signal or the NTSC composite signal after conversion.

To achieve the above-described object, according to the present invention, a video signal level monitoring apparatus is provided, which monitors the level of a video signal, the apparatus having means for inputting a first color difference component (Cb) and a second color difference component (Cr) of a component video signal, means for inputting a luminance component (Y) of the component video signal as a luminance component (Y) of a composite video signal, means for generating a color component (C) of the composite video signal from the first color difference component and the second color difference component, and means for displaying each of the amplitude values of the color component (C) and the luminance component (Y) in a one-dimensional direction.

The display means may display the amplitude values in a bar graph display and in different colors, and may display information as to whether the composite video signal is within a range in accordance with a predetermined standard. Further, the display means may display the waveform of the video signal.

DETAILED DESCRIPTION OF THE INVENTION

An embodiment of the present invention will be described with reference to the accompanying drawings.

Figure 1:
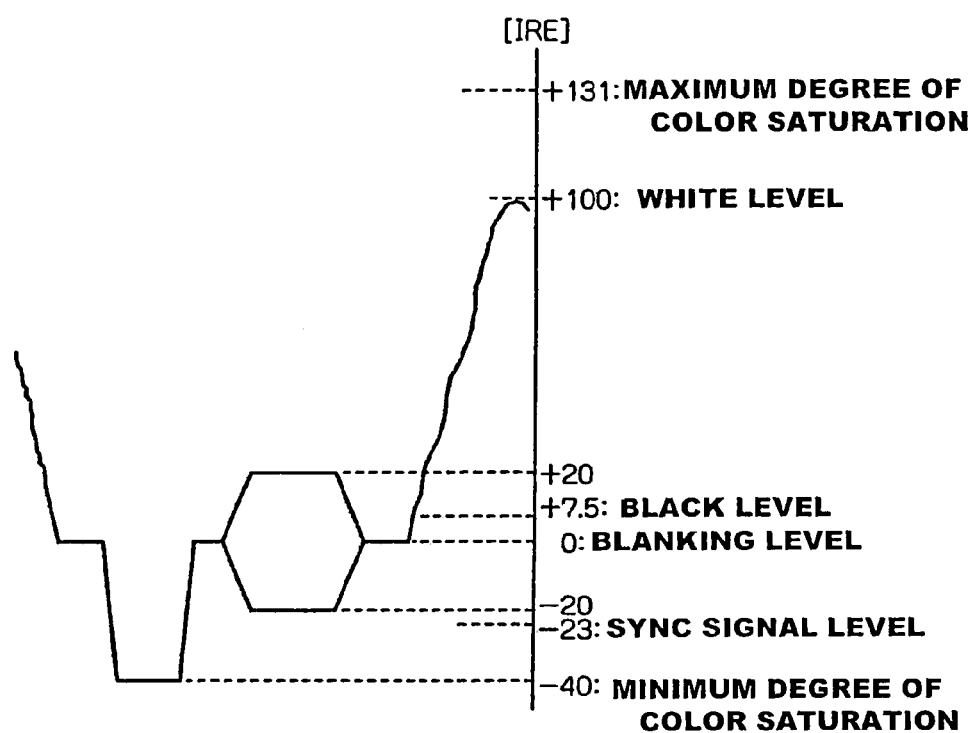
FIG. 1 is a diagram showing the SMPTE170 standard.
Figure 2:
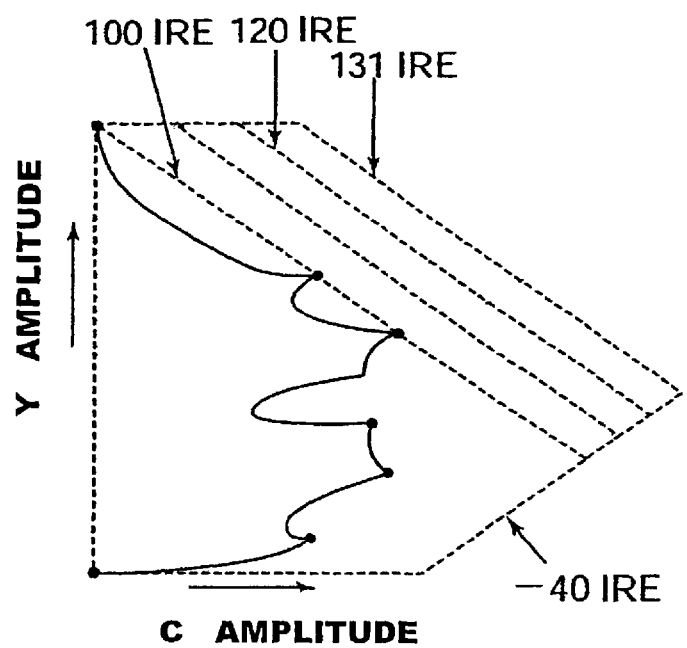
FIG. 2 is a diagram showing a conventional display for controlling the level of an NTSC composite signal converted from a Y/color difference component signal.
Figure 3:
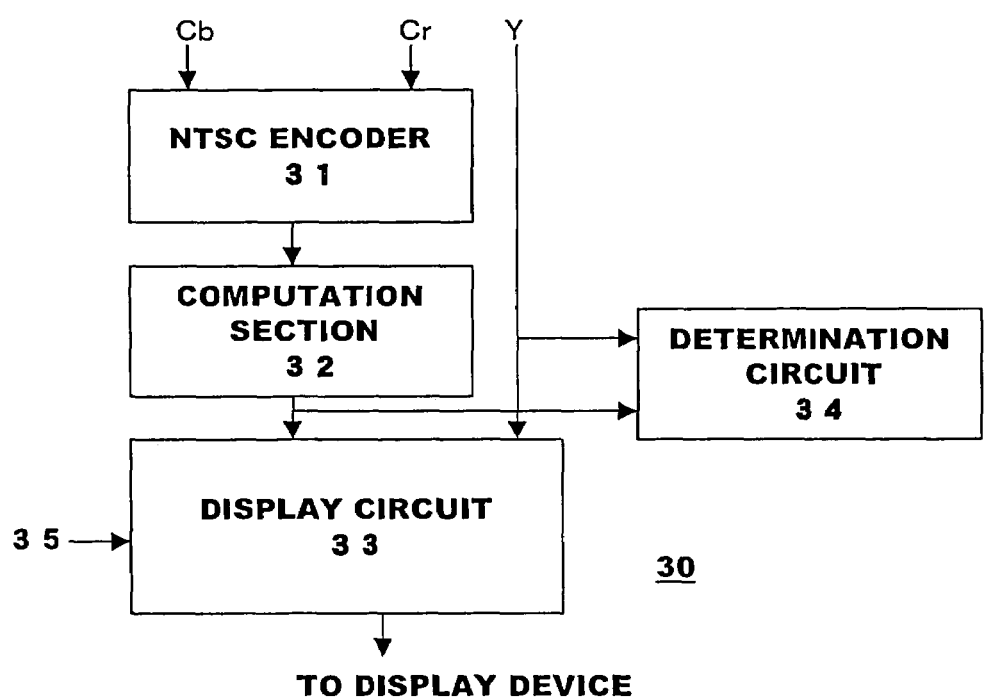
FIG. 3 is a schematic block diagram of an apparatus in accordance with the present invention which monitors the level of a video signal.
Figure 4:
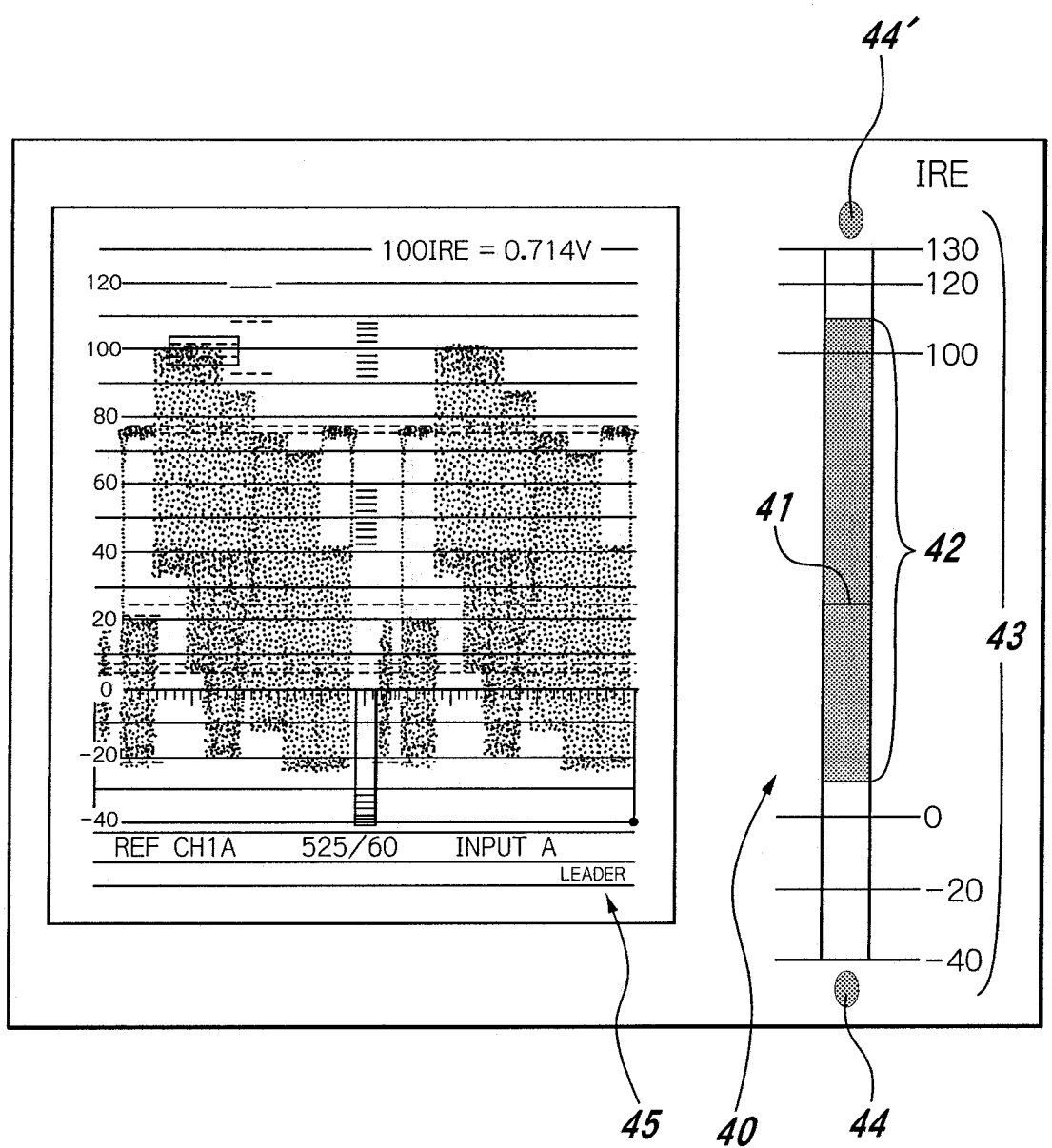
FIG. 4 is a diagram showing an example of a display for control of the level of the NTSC composite signal in accordance with the present invention.
Figure 5:
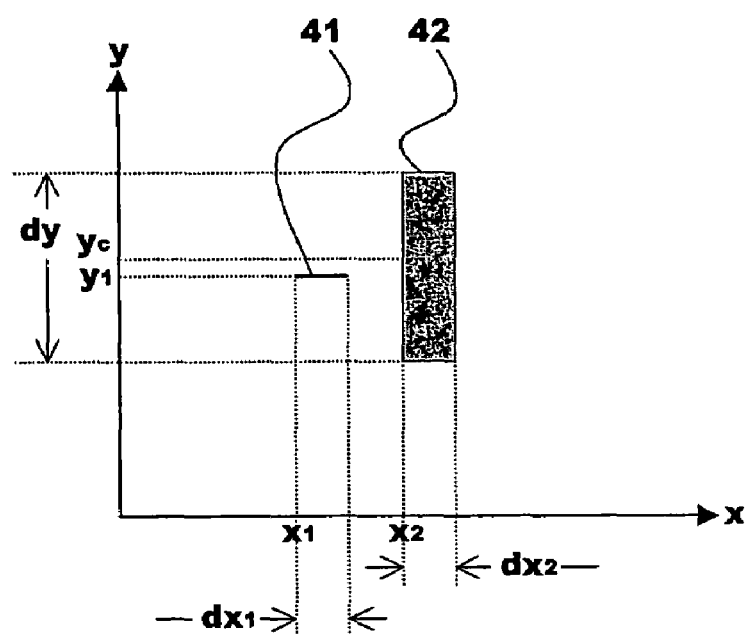
FIG. 5 is a diagram for explaining the bar graph display shown in FIG. 4.

Referring to FIGS. 3 to 5, an apparatus 30 of the present invention which monitors the level of a video signal mainly has an NTSC encoder 31 to which a first color difference component (Cb) and a second color difference component (Cr) of a component signal are input and which generates color components of an NTSC composite signal, a bar graph computation section 32 to which the NTSC color components are input and which generates an amplitude value of the color components, and a display circuit 33 to which a luminance component (Y) of the component signal is input as a luminance component of the NTSC composite signal and which one-dimensionally (in a predetermined direction) displays the amplitude value of the NTSC color components and the amplitude value of the NTSC luminance component. (The luminance component (Y) of the component signal is equal to the luminance component of the NTSC composite signal.)

The operation of the video signal level monitoring apparatus 30 will be described in conjunction with a concrete configuration of the apparatus.

The NTSC encoder 31 is supplied with the first color difference component (Cb) and the second color difference component (Cr) of the component signal. The NTSC encoder 31 then generates an NTSC color signal formed of (x, y)=(first color difference component (Cb), second color difference component (Cr)) (e.g., the NTSC color signal in accordance with the SMPTE170M standard). The NTSC encoder 31 then outputs the NTSC color signal to the bar graph computation section 32.

The bar graph computation section 32 generates the amplitude value of the color components of the NTSC composite signal. More specifically, the bar graph computation section 32 obtains a peak-to-peak value of the NTSC composite signal as the color component amplitude value to produce a bar graph display described below (to obtain a dy value shown in FIG. 5). The bar graph computation section 32 outputs the generated amplitude value of the color components of the NTSC composite signal to the display circuit 33.

To the display circuit 33, the luminance component (Y) corresponding to the first color difference component (Cb) and the second color difference component (Cr) of the component signal is input as the luminance component (Y) of the NTSC composite signal. As shown in FIG. 4, the display circuit 33 then indicates in a bar graph display 40 the amplitude value (luminance level 41) of the luminance component of the NTSC composite signal and the amplitude value (color level 42) of the color components.

To produce the bar graph display as shown in FIG. 5, the display circuit 33 performs computations described below. The display circuit 33 first computes a position y1 in the vertical direction (a graphic memory address "y1" in the vertical direction) corresponding to the amplitude value of the luminance component of the NTSC composite signal. The display circuit 33 then displays one straight line 41 (first graphic address group "x1≦x≦x1+dx1, y=y1") corresponding to the amplitude value of the luminance component of the NTSC composite signal by using a predetermined position x1 in the horizontal direction (graphic memory address "x1" in the horizontal direction), a predetermined length dx1 and the position y in the vertical direction.

The display circuit 33 further computes a length dy in the vertical direction corresponding to the amplitude value of the color components of the NTSC composite signal. The display circuit 33 then displays an area 42 (second graphic memory address group "x2≦x≦x2+dx2, yc−dy/2≦y≦yc+dy/2, exclusive of x1≦x≦x1+dx1, y=y1) corresponding to the amplitude value of the color components of the NTSC composite signal by using a predetermined position x2 in the horizontal direction (graphic memory address "x2" in the horizontal direction), a predetermined length dx2, a predetermined position yc in the vertical direction, and a length dy.

While in FIG. 5 and the above description x≠x2 and yc≠y1 are assumed for explanation of the bar graph display, the display circuit 33 computes and displays the straight line 41 and the area 42 by using x1=x2 and yc=y1. Also, while dx1 and dx2 are shown discriminably, it is preferred that the display circuit 33 compute and display the straight line 41 and the area 42 by using dx1=dx2.

The display circuit 33 may store in advance a table in which the relationship between the amplitude values of the luminance component and the color components of the NTSC composite signal and the computations at the time of bar graph display (first and second graphic memory address groups) are expressed, and may use this table to produce the bar graph display without performing the computations.

Preferably, the display circuit 33 indicates the amplitude value (luminance level 41) of the luminance component of the NTSC composite signal and the amplitude value (color level 42) in IRE units in bar graph display 40 with an IRE scale 43. Preferably, at the time of bar graph display 40, the IRE scale includes a minimum acceptable value (−40 IRE) and a maximum acceptable value (+131 IRE) within a range in accordance with the SMPTE170M standard. More preferably, the IRE scale further includes an acceptable luminance value (+120 IRE) with respect to the level of the luminance component of the NTSC composite signal.

Preferably, the display circuit 33 produces the display so that the color (e.g., red) for indication of the amplitude value (luminance level 41: the first graphic memory address group) of the luminance component of the NTSC composite signal and the color (e.g.; yellow) for indication of the amplitude value (luminance level 42: the second graphic memory address group) of the color components of the NTSC composite signal are different from each other. Alternatively, the display circuit 33 produces the display so that the luminance (e.g., 100%) for indication of the amplitude value (luminance level 41) of the luminance component of the NTSC composite signal and the luminance (e.g., 50%) for indication of the amplitude value (luminance level 42) of the color components of the NTSC composite signal are different from each other.

Further, preferably, the display circuit 33 is supplied with a waveform signal 35 of the NTSC composite signal or the Y/color difference component signal, as shown in FIG. 3. As shown in FIG. 4, the display circuit 33 produces a waveform display 45 of the waveform signal as well as the bar graph display 40.

Further, preferably, the video signal level monitoring apparatus 30 has a circuit 34 for determination as to whether the level of the NTSC composite signal is within the range in accordance with the SMPTE170M standard, as shown in FIG. 3. The luminance component of the NTSC composite signal and the color components of the NTSC composite signal from the bar graph computation section 32 are input to the circuit 34. Alternatively, the color components of the NTSC composite signal from the NTSC encoder 31 may be input to the circuit 34.

The circuit 34 determines whether or not the minimum value of the NTSC composite signal (y1−dy/2 in FIG. 5 or a value obtained by adding together the amplitude value of the luminance component and the lower peak value (the minus peak value) of the color components) is lower than the minimum acceptable value (−40 IRE) in the range in accordance with the SMPTE170M standard. If the minimum value of the NTSC composite signal is lower than the acceptable value, the circuit 34 generates a first alarm signal. Similarly, the circuit 34 determines whether or not the maximum value of the NTSC composite signal (y1+dy/2 in FIG. 5 or a value obtained by adding together or the amplitude value of the luminance component and the upper peak value (the minus peak value)of the color components) is higher than the maximum acceptable value (+131 IRE) in the range in accordance with the SMPTE170M standard, and generates a second alarm signal if the maximum value of the NTSC composite signal is higher than the acceptable value.

Preferably, the circuit 34 determines whether or not the amplitude value (y1) of the luminance component of the NTSC composite signal is higher than the acceptable luminance value (+120 IRE) with respect to the level of the luminance component (Y), and generates a third alarm signal if the amplitude value is higher than the acceptable value.

When the circuit 34 generates an alarm signal, it outputs the alarm signal to the display circuit 33. When the display circuit 33 is supplied with the first alarm signal, it lights a first alarm lamp 44, for example, in red, as shown in FIG. 4. Preferably, the first alarm lamp 44 is placed close to a portion of the scale 43 corresponding to the minimum acceptable value. Similarly, the display circuit 33 lights a second alarm lamp 44', for example, in red when supplied with the second alarm signal, and lights the second alarm signal 44', for example, in yellow when supplied with the third alarm signal. Preferably, the second alarm lamp 44' is placed close to a portion of the scale 43 corresponding to the maximum acceptable value.

The display circuit 33 may light a third alarm lamp (not shown) when supplied with the third alarm signal. In this case, the third alarm lamp is placed close to a portion of the scale 43 corresponding to the acceptable luminance value.

It should be understood that the apparatus 30 according to the present invention is not limited to the illustrated example described above, but may be modified in various manners without departing from the spirit of the invention.

What is claimed is:

1. A video signal level monitoring apparatus which monitors the level of a video signal, said apparatus comprising:

means for inputting a first color difference component (Cb) and a second color difference component (Cr) of a component video signal;

means for inputting a luminance component (Y) of the component video signal as a luminance component (Y) of a composite video signal;

means for generating a color component (C) of the composite video signal from the first color difference component and the second color difference component; and means for displaying each of the amplitude values of the color component (C) and the luminance component (Y) in a one-dimensional direction, wherein one of said amplitude values is superposed on the other of said amplitude values, and said amplitude value of the color component (C) is a peak-to-peak value.

2. The apparatus according to claim 1, wherein said display means displays each amplitude value by using a predetermined unit system.

3. The apparatus according to claim 1, wherein said display means displays each amplitude value in a bar graph display.

4. The apparatus according to claim 1, wherein said display means displays the amplitude values in different colors.

5. The apparatus according to claim 1, wherein said display means further displays scale marks corresponding to a minimum acceptable value and a maximum acceptable value within a range in accordance with a predetermined standard.

6. The apparatus according to claim 1, wherein said display means further displays information as to whether the composite video signal is within a range in accordance with a predetermined standard.

7. The apparatus according to claim 1, wherein said display means displays the waveform of the video signal.

* * * * *